United States Patent
Frederiksen et al.

(10) Patent No.: US 10,165,594 B2
(45) Date of Patent: *Dec. 25, 2018

(54) METHOD, APPARATUS AND COMPUTER PROGRAM TO MAP A CYCLIC SHIFT TO A CHANNEL INDEX

(71) Applicant: Nokia Solutions and Networks OY, Espoo (FI)

(72) Inventors: Frank Frederiksen, Klarup (DK); Esa Tiirola, Kempele (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 15/377,431

(22) Filed: Dec. 13, 2016

(65) Prior Publication Data

US 2017/0094682 A1    Mar. 30, 2017

Related U.S. Application Data

(63) Continuation of application No. 14/564,311, filed on Dec. 9, 2014, now Pat. No. 9,538,504, which is a
(Continued)

(51) Int. Cl.
*H04W 72/14* (2009.01)
*H04L 1/16* (2006.01)
(Continued)

(52) U.S. Cl.
CPC ........... *H04W 72/14* (2013.01); *H04L 1/1607* (2013.01); *H04L 1/1812* (2013.01);
(Continued)

(58) Field of Classification Search
CPC .... H04W 72/14; H04L 1/1812; H04L 5/0048; H04L 5/0055; H04L 27/2607
See application file for complete search history.

(56) References Cited

U.S. PATENT DOCUMENTS 6,023,783 A    2/2000    Divsalar
6,631,491 B1    10/2003    Shibutani
(Continued)

FOREIGN PATENT DOCUMENTS

CN    1866946 A    11/2006
CN    101102140 A    1/2008
(Continued)

OTHER PUBLICATIONS

Motorola R1-073409, MU-MIMO PHICH Assignment for Adaptive and non-Adaptive HARQ; 2007.
(Continued)

*Primary Examiner* — Chandrahas B Patel
(74) *Attorney, Agent, or Firm* — Harrington & Smith

(57) ABSTRACT

From the network perspective, an uplink resource allocation (PDCCH) is sent that grants an uplink resource to a plurality of user equipments UEs, and the allocation has an indication of a cyclic shift CS for each of the plurality of UEs. The granted uplink resource is mapped to a downlink resource (PHICH) in dependence on the indicated CS for each of the plurality of UEs. The mapping is such that for a predetermined number of UEs being allocated a same uplink resource in a single MU-MIMO uplink resource allocation grant, each pair of said predetermined number of UEs which map to an adjacent downlink resource exhibit an optimized CS relative to one another. The network sends to each of the respective plurality of UEs on the respective mapped downlink resource an indication (ACK/NACK) about data received (on a PUSCH). Apparatus, method, and computer programs for network and UE side implementations are detailed.

26 Claims, 8 Drawing Sheets

Related U.S. Application Data continuation of application No. 13/551,165, filed on Jul. 17, 2012, now Pat. No. 8,923,229, which is a continuation of application No. 12/322,550, filed on Feb. 4, 2009, now Pat. No. 8,289,935.

(60) Provisional application No. 61/063,620, filed on Feb. 4, 2008.

(51) Int. Cl.
| | |
|---|---|
| *H04L 1/18* | (2006.01) |
| *H04L 5/00* | (2006.01) |
| *H04W 72/00* | (2009.01) |
| *H04W 72/04* | (2009.01) |
| *H04L 27/26* | (2006.01) |
| *H04W 28/04* | (2009.01) |

(52) U.S. Cl.
CPC .......... *H04L 1/1854* (2013.01); *H04L 5/0044* (2013.01); *H04L 5/0048* (2013.01); *H04L 5/0053* (2013.01); *H04L 5/0055* (2013.01); *H04L 5/0091* (2013.01); *H04L 27/2607* (2013.01); *H04W 72/00* (2013.01); *H04W 72/04* (2013.01); *H04W 72/0406* (2013.01); *H04L 5/0005* (2013.01); *H04W 28/04* (2013.01); *H04W 72/042* (2013.01); *H04W 72/0493* (2013.01)

(56) References Cited

U.S. PATENT DOCUMENTS

| | | |
|---|---|---|
| 7,627,348 B2 | 12/2009 | Lysejko et al. |
| 7,778,148 B2 | 8/2010 | Lee |
| 7,778,151 B2 | 8/2010 | Bertrand et al. |
| 7,881,222 B2 | 2/2011 | Lee |
| 8,218,863 B2 | 7/2012 | Muharemovic et al. |
| 8,279,811 B2 | 10/2012 | Love et al. |
| 8,423,044 B2 | 4/2013 | Lee |
| 8,520,656 B2 | 8/2013 | Papasakellariou et al. |
| 8,565,166 B2 | 10/2013 | Kawamura et al. |
| 8,588,201 B2 | 11/2013 | Venkatachalam et al. |
| 2007/0171849 A1 | 7/2007 | Zhang et al. |
| 2008/0225822 A1 | 9/2008 | Zhang et al. |
| 2010/0118803 A1 | 5/2010 | Ishii et al. |
| 2010/0173639 A1 | 7/2010 | Li et al. |
| 2011/0299490 A1 | 12/2011 | Nordstrom et al. |

FOREIGN PATENT DOCUMENTS

| | | |
|---|---|---|
| CN | 101330454 A | 12/2008 |
| EP | 0759665 A1 | 2/1997 |
| EP | 2083530 A2 | 7/2009 |
| EP | 2156587 | 2/2010 |
| EP | 2241049 | 10/2010 |
| EP | 2250849 B1 | 11/2010 |
| EP | 2317681 A1 | 5/2011 |
| RU | 2005118847 A | 12/2006 |
| WO | WO 2008/132073 A1 | 11/2008 |
| WO | WO 2009/087182 A2 | 7/2009 |

OTHER PUBLICATIONS

Optimal Interleaving Scheme for Convolutional Coding; Electronics Letters Oct. 26, 1989 vol. 25 No. 22.
R1-073479 Mapping Relations between UL VRB and DL ACKNACK; 3GPP TSG RAN WG1#50 Athens, Greece Aug. 20-24, 2007.
"PHICH Assignment for MU-MIMO in E-UTRA", 3GPP TSG RAN1 #50bis, R1-074002, Oct. 8-12, 2007, (1 page).
"Downlink ACK/NACK Signaling for E-UTRA", TSG-RAN WG1#5Bis, R1-074163, Oct. 8-12, 2007, (6 pages).
"PHICH Assignment in E-UTRA", 3GPP TSG RAN1 #51, R1-074588, Nov. 5-9, 2007 (3 pages).
"3rd Generation Partnership Project; Technical Specification Group Radio Access Network; Evolved Universal Terrestrial Radio Access (E-UTRA); Physical layer procedures (Release 13)", 3GPP TS 36.213, V8.1.0 (Nov. 2007), 17 pgs.
"3rd Generation Partnership Project; Technical Specification Group Radio Access Network; Evolved Universal Terrestrial Radio Access (E-UTRA); Physical Channels and Modulation (Release 8)", 3GPP TS 36.211, V8.1.0 (Nov. 2007), 54 pgs.
"PHICH and mapping to PHICH groups", 3GPP TSG RAN WG I Meeting #5 Ibis, R1-080301, Jan. 2008, 5 pgs.
International Search Report for corresponding patent application PCT/EP2009/051259 dated May 13, 2009.

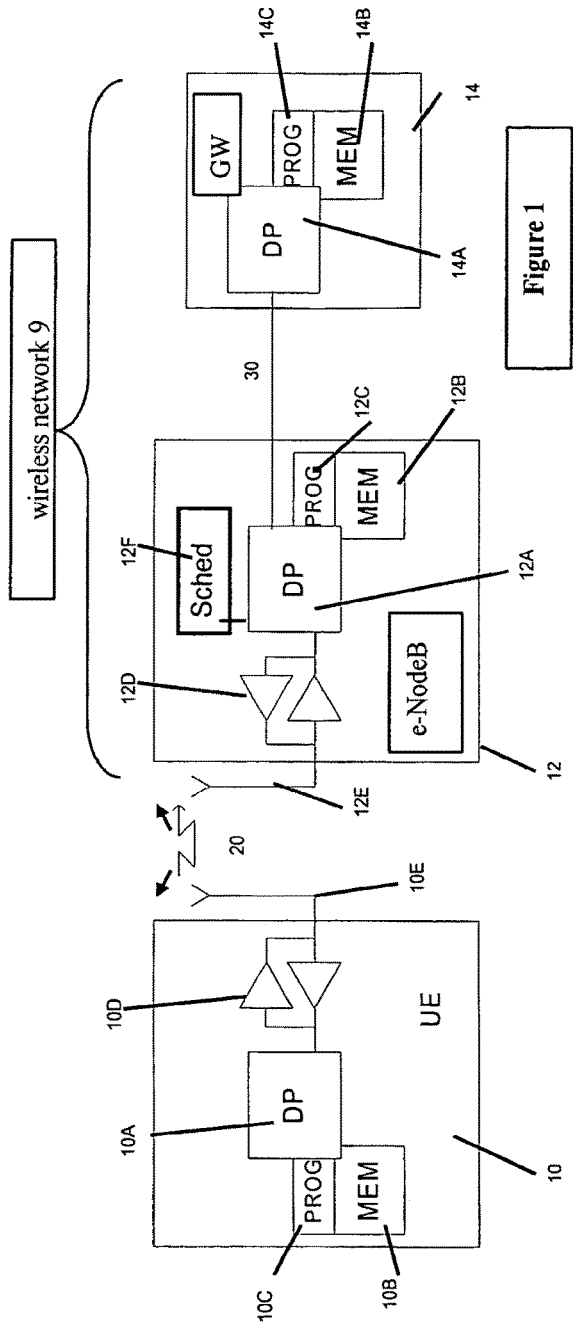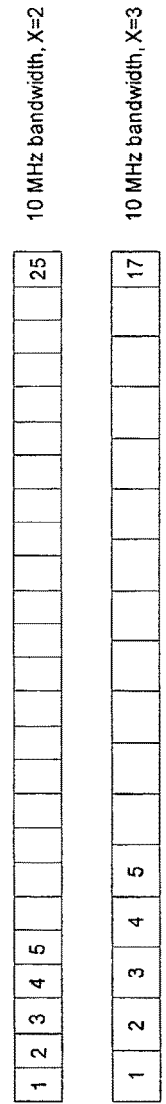

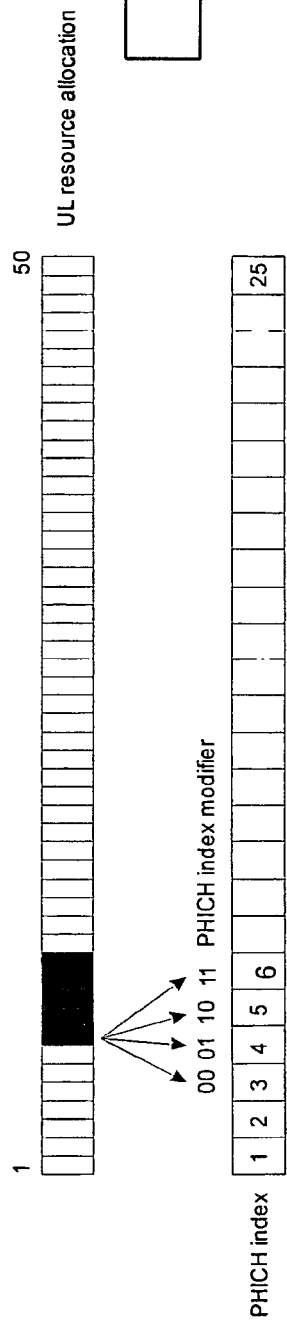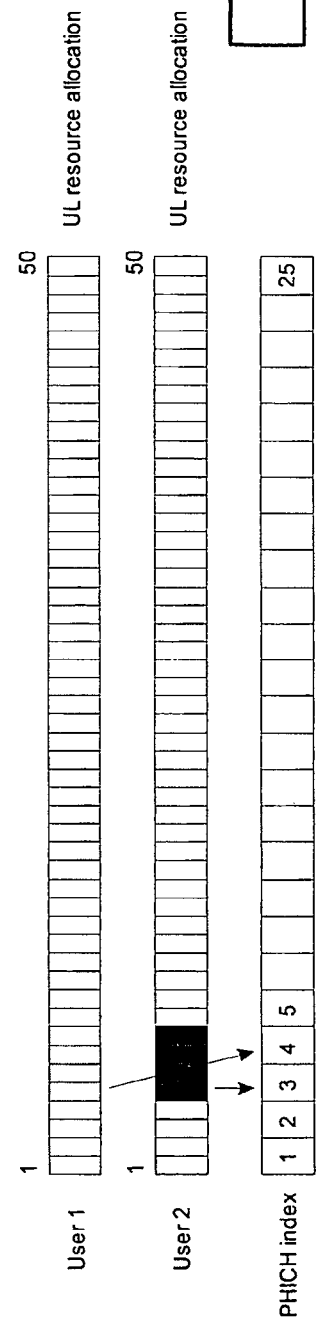

2 RUs (360 kHz)

4 RUs (720 kHz)

1 RU (180 kHz)

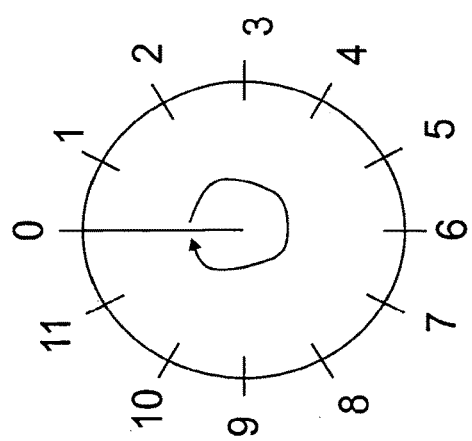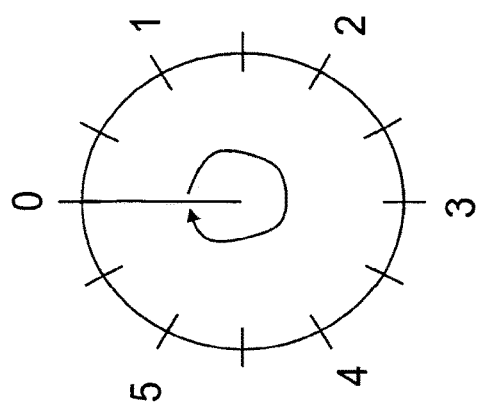
Figure 6A
Figure 6B

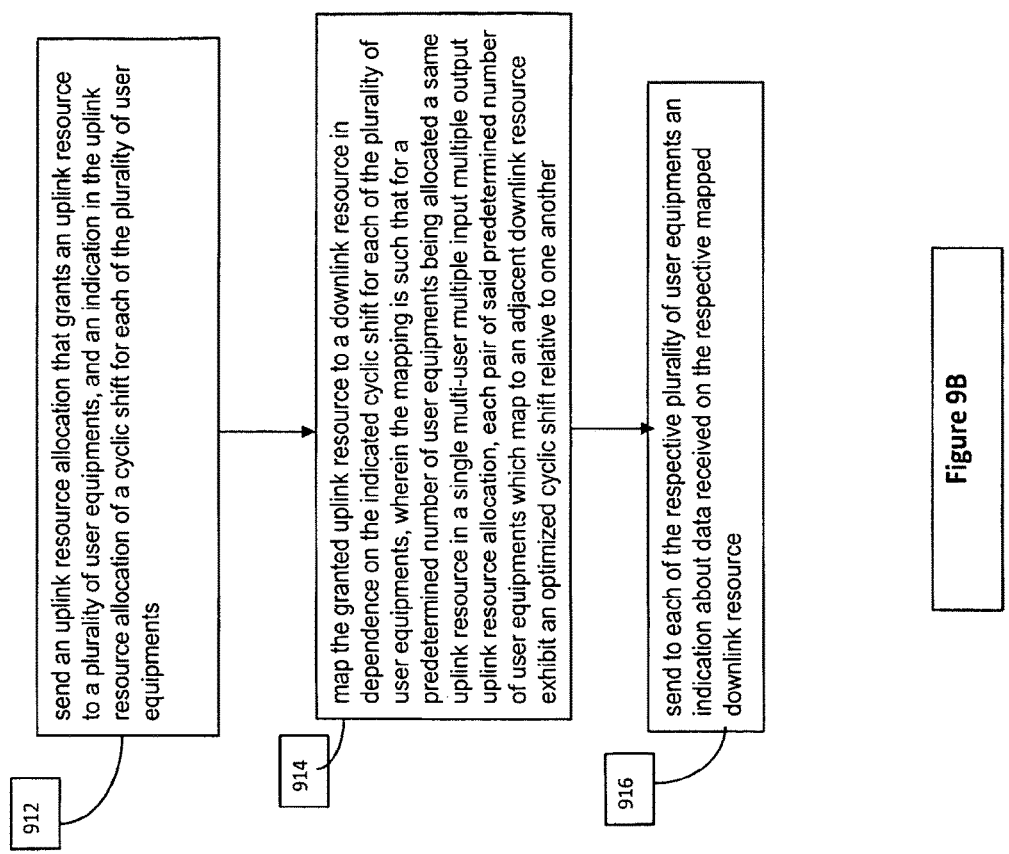

METHOD, APPARATUS AND COMPUTER PROGRAM TO MAP A CYCLIC SHIFT TO A CHANNEL INDEX

CROSS-REFERENCE TO RELATED APPLICATION

This patent application is a continuation of the U.S. patent application Ser. No. 14/564,311 filed on Dec. 9, 2014, which was a continuation of the U.S. patent application Ser. No. 13/551,165 filed on Jul. 17, 2012, which was a continuation application of the U.S. patent application Ser. No. 12/322,550 filed on Feb. 4, 2009 (Publication No. US-2009-0196240), and which claims priority under 35 U.S.C. § 119(e) from US Provisional Patent Application No.: 61/063,620, filed Feb. 4, 2008, the disclosure of which is incorporated by reference in its entirety.

TECHNICAL FIELD

The teachings herein relate generally to wireless networks that employ an ACK/NACK protocol, particularly where the ACK/NACK is sent on one channel that is implicitly mapped based on the occupied physical data/control resources of the data to which the ACK/NACK refers.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations are used in the description below:
3GPP third generation partnership project
ACK/NACK acknowledgement/negative acknowledgement
CSI cyclic shift index
DL downlink
DM RS demodulation reference symbols
e-NodeB/eNB node B (access node/base station) of an E-UTRAN system
E-UTRAN evolved UTRAN
FDD frequency division duplex
H-ARQ hybrid automatic repeat request
LTE long term evolution of 3GPP
MU-MIMO multi-user multiple input/multiple output
Node B base station or similar network access node, including e-NodeB
PBCH physical broadcast channel
PDCCH physical downlink control channel
PHICH physical H-ARQ indicator channel
PRB physical resource block
PUSCH physical uplink shared channel
PUCCH physical uplink control channel
TDD time division duplex
TTI transmission time interval
UE user equipment (e.g., mobile equipment/station)
UL uplink
UMTS universal mobile telecommunications system
UTRAN UMTS terrestrial radio access network 3GPP is standardizing the long-term evolution (LTE) of the radio-access technology which aims to achieve reduced latency, higher user data rates, improved system capacity and coverage, and reduced cost for the operator. Specifically, LTE employs the concept of the e-NodeB scheduling its own radio resources within the cell, which gives more flexibility to put available resources to use and also reduces latency in addressing uplink and downlink needs of the various user equipments in the cell. Its most flexible form is dynamic scheduling, where a single scheduling grant sent on a shared control channel (e.g., PDCCH) grants to one particular user equipment one particular amount of physical resources. This amount of physical resources is constructed of a number of uplink physical resource blocks. The Node B (or its surrogate in the case of relay stations) then must send an ACK or NACK as appropriate to the user equipment once that granted set of UL PRBs passes so the UE can know whether or not it must re-transmit its UL data. LTE sends the ACK/NACK on a special channel (PHICH). The ACK/NACK on the PHICH is made compatible with dynamic scheduling by mapping the UL resource granted to the UE to the particular PHICH where the ACK/NACK is to be. This FDD mode mapping from the PRB to the proper PHICH is readily extended to the TDD mode also, and LTE uses both modes.

So in the FDD mode of LTE, for each UL resource grant (signalled on the DL PDCCH) there will be an associated H-ARQ feedback channel for positive (ACK) or negative (NACK) acknowledgements of data that the UE sends on that granted UL resource. In the current understanding in 3GPP, there will be a delay between the time of the UL grant (on the PDCCH) to the time where the UE will actually transmit its uplink data on the granted UL resources, and further another delay to the time where the eNodeB should send the ACK/NACK on the PHICH responding whether or not the eNodeB received the UE's UL data. The current assumption is that the scheduling delay will be 3 ms (plus the delay of the actual signalling on the PDCCH), and that the eNodeB processing time will also be 3 ms. Assuming one TTI=1 msec and indexing TTIs from zero, this means that the timing relation for a single H-ARQ process or channel will be that the UL allocation grant on the PDCCH is at TTI#0; the UL data transmission will be no earlier than TTI#4, and the ACK/NACK on the PHICH will be no earlier than TTI#8. Instead of the ACK/NACK the eNodeB can send a dynamic scheduling (on the PDCCH), which is termed adaptive H-ARQ but still subject to the same minimum time delay.

Related to the H-ARQ operation, there is also the need to convey the reception status to the UE that originally transmitted the data packet to the e-Node B. For this there are several options. For the case that adaptive H-ARQ is used for the uplink, retransmissions are dynamically scheduled. For the case of continuous traffic, a packet on the granted UL resource is acknowledged by the e-Node allocating resources for the UE to send the next data packet. The case where the UE has no further/new data to send is where the PHICH becomes relevant. The PHICH is a per-UE dedicated channel which is temporarily assigned to the UE which transmitted the data packet, and as above is tied to the allocated uplink physical resources so that the proper data packet can be identified with a particular ACK/NACK on the PHICH. See U.S. Provisional Patent Application 61/010,354, filed Jan. 7, 2008 and entitled "Method, Apparatus and Computer Program to Map a Downlink Resource to a Related Uplink Transmission" (now U.S. patent application Ser. No. 12/349,683, filed Jan. 7, 2009). See also: R1-080301, *PHICH and mapping to PHICH Groups*, 3GPP TSG RAN WG1 MEETING #51BIS, Sevilla, Spain, Jan. 14-18, 2008 by Nokia and Nokia Siemens Networks.

For the case where non-adaptive H-ARQ is used for uplink (meaning that uplink retransmissions are performed on the same physical resources), the UE only needs an indication of whether or not it should do a retransmission in the uplink. This is handled through PHICH signalling. While not yet settled in LTE, it is expected that the UE would probably be assigned a PHICH resource (or PHICH channel) through its allocated physical resources for the uplink transmission. For the case where multi-user MIMO is used, there is the potential for a collision of the assigned PHICH channels. MU-MIMO is a special case of dynamic allocations that might be used where the same uplink transmission resources are allocated to two or more users at the same time.

The UEs are divided to one or more groups and for each UE group a PHICH group is assigned, a PHICH group consisting of physical resources that can at maximum carry 8 ACKs/NACKs (in the case where a short cyclic prefix is used; for a long cyclic prefix the number might be less). The UE knows the ACK/NACK resources inside the PHICH group from the CSI of the DM RS, which is signaled to the UE in its UL grant for the corresponding UL transmission. This CSI is 3-bits and with these bits the exact ACK/NACK inside the PHICH group can be identified (or in another group, see 3GPP TS 36.213).

This previous approach is also applied for the MU-MIMO case. In the MU-MIMO case, two users at different channel conditions are assigned to the same physical (time/frequency) resources and their transmissions can be decoded in the e-NodeB due to those different channel conditions (e.g. different physical locations). The 'same' resources may be overlapping rather than wholly identical. In order to differentiate multiplexed UEs sharing the same physical resource at the receiver side, there should be low enough cross-correlation between the reference signals. This can be arranged by allocating different cyclic shift of the same DM RS for different MU-MIMO terminals. In this case, signaling of the cyclic shift can be done using dynamic CSI included in the UL grant (3 bits).

Currently, the suggestions known to the inventors for mapping between the granted UL resources and the PHICH that relates to the data on those granted UL resources has been focused on ensuring that there is a consistent configuration of the physical channels themselves. In the inventors' view this ignores a key aspect that would lead to the most efficient implementation when considering the entire radio frequency picture. The CSI is used to find the proper PHICH, but the CSI itself affects the cross-correlation properties between the UEs' transmissions. What is needed in the art is a comprehensive solution to map a UL resource to a DL resource on which the ACK/NACK for that UL resource is sent while taking into account the effects that different CSI has on the UEs.

SUMMARY

The foregoing and other problems are overcome, and other advantages are realized, by the use of the exemplary embodiments of this invention.

In accordance with one exemplary embodiment of the invention there is a method comprising: receiving an uplink resource allocation that grants an uplink resource to a plurality of user equipments, and an indication in the uplink resource allocation of a cyclic shift; sending data on the granted uplink resource; mapping the granted uplink resource to a downlink resource in dependence on the indicated cyclic shift, wherein the mapping is such that for a predetermined number of user equipments being allocated a same uplink resource in a single multi-user multiple input multiple output uplink resource allocation, each ones of said predetermined number of user equipments which map to an adjacent downlink resource exhibit an optimized cyclic shift relative to one another; and tuning a receiver to receive on the mapped downlink resource an indication about the sent data.

In accordance with another exemplary embodiment of the invention is a memory storing a program of computer readable instructions that when executed by a processor result in actions that comprise: receiving an uplink resource allocation that grants an uplink resource to a plurality of user equipments, and an indication in the uplink resource allocation of a cyclic shift; sending data on the granted uplink resource; mapping the granted uplink resource to a downlink resource in dependence on the indicated cyclic shift, wherein the mapping is such that for a predetermined number of user equipments being allocated a same uplink resource in a single multi-user multiple input multiple output uplink resource allocation, each ones of said predetermined number of user equipments which map to an adjacent downlink resource exhibit an optimized cyclic shift relative to one another; and tuning a receiver to receive on the mapped downlink resource an indication about the sent data.

In accordance with another exemplary embodiment of the invention is an apparatus that includes a receiver, a transmitter, a computer readable memory and a processor. The receiver is configured to receive an uplink resource allocation that grants an uplink resource to a plurality of user equipments, and an indication in the uplink resource allocation of a cyclic shift. The transmitter is configured to send data on the granted uplink resource. The memory stores a mapping rule which maps a granted uplink resource to a downlink resource in dependence on a cyclic shift such that for a predetermined number of user equipments being allocated a same uplink resource in a single multi-user multiple input multiple output uplink resource allocation, each ones of said predetermined number of user equipments which map to an adjacent downlink resource exhibit an optimized cyclic shift relative to one another. And the processor is configured to map the granted uplink resource to a downlink resource in dependence on the indicated cyclic shift according to the mapping rule stored in the memory. Additionally, the receiver is further configured to receive on the mapped downlink resource an indication about the sent data.

In accordance with a still further exemplary embodiment of the invention is an apparatus that includes receive means (e.g., a receiver), sending means (e.g., a transmitter), storing means (e.g., a computer readable memory) and processing means (e.g., a processor). The receive means is for receiving an uplink resource allocation that grants an uplink resource to a plurality of user equipments, and an indication in the uplink resource allocation of a cyclic shift. The sending means is for sending data on the granted uplink resource. The storing means is for storing a mapping rule which maps a granted uplink resource to a downlink resource in dependence on a cyclic shift such that for a predetermined number of user equipments being allocated a same uplink resource in a single multi-user multiple input multiple output uplink resource allocation, each ones of said predetermined number of user equipments which map to an adjacent downlink resource exhibit an optimized cyclic shift relative to one another. And the processing means is for mapping the granted uplink resource to a downlink resource in dependence on the indicated cyclic shift according to the mapping rule stored in the storing means. Additionally, the receive means is further for receiving on the mapped downlink resource an indication about the sent data.

In accordance with yet another exemplary embodiment of the invention is a method that comprises: sending an uplink resource allocation that grants an uplink resource to a plurality of user equipments, and an indication in the uplink resource allocation of a cyclic shift for each of the plurality of user equipments; mapping the granted uplink resource to a downlink resource in dependence on the indicated cyclic shift for each of the plurality of user equipments, wherein the mapping is such that for a predetermined number of user equipments being allocated a same uplink resource in a single multi-user multiple input multiple output uplink resource allocation, each pair of said predetermined number of user equipments which map to an adjacent downlink resource exhibit an optimized cyclic shift relative to one another; and sending to each of the respective plurality of user equipments on the respective mapped downlink resource an indication about data received.

In accordance with a further exemplary embodiment of the invention is a memory storing a program of computer readable instructions that when executed by a processor result in actions that comprise: sending an uplink resource allocation that grants an uplink resource to a plurality of user equipments, and an indication in the uplink resource allocation of a cyclic shift for each of the plurality of user equipments; mapping the granted uplink resource to a downlink resource in dependence on the indicated cyclic shift for each of the plurality of user equipments, wherein the mapping is such that for a predetermined number of user equipments being allocated a same uplink resource in a single multi-user multiple input multiple output uplink resource allocation, each pair of said predetermined number of user equipments which map to an adjacent downlink resource exhibit an optimized cyclic shift relative to one another; and sending to each of the respective plurality of user equipments on the respective mapped downlink resource an indication about data received.

In accordance with yet a further exemplary embodiment of the invention is an apparatus that includes a processor, a memory and a transmitter. The transmitter is configured to send an uplink resource allocation that grants an uplink resource to a plurality of user equipments, and an indication in the uplink resource allocation of a cyclic shift for each of the plurality of user equipments. The memory stores a mapping of an uplink resource to a downlink resource in dependence on a cyclic shift for each of the plurality of cyclic shifts, wherein the mapping is such that for a predetermined number of user equipments being allocated a same uplink resource and a different cyclic shift in a single multi-user multiple input multiple output uplink resource allocation, each pair of mapped adjacent downlink resource exhibit an optimized cyclic shift relative to one another. The processor is configured to map the granted uplink resource to a downlink resource in dependence on the indicated cyclic shift for each of the plurality of user equipments according to the mapping stored in the memory. The transmitter is further configured to send to each of the respective plurality of user equipments on the respective mapped downlink resource an indication about data received.

In accordance with a still further exemplary embodiment of the invention is an apparatus that includes processing means (e.g., a processor), storing means (e.g., a computer readable memory) and sending means (e.g., a transmitter). The sending means is for sending an uplink resource allocation that grants an uplink resource to a plurality of user equipments, and an indication in the uplink resource allocation of a cyclic shift for each of the plurality of user equipments. The storing means is for storing a mapping of an uplink resource to a downlink resource in dependence on a cyclic shift for each of the plurality of cyclic shifts, wherein the mapping is such that for a predetermined number of user equipments being allocated a same uplink resource and a different cyclic shift in a single multi-user multiple input multiple output uplink resource allocation, each pair of mapped adjacent downlink resource exhibit an optimized cyclic shift relative to one another. The processing means is for mapping the granted uplink resource to a downlink resource in dependence on the indicated cyclic shift for each of the plurality of user equipments according to the mapping stored in the storing means. The sending means is further for sending to each of the respective plurality of user equipments on the respective mapped downlink resource an indication about data received.

BRIEF DESCRIPTION OF THE DRAWINGS

The foregoing and other aspects of these teachings are made more evident in the following Detailed Description, when read in conjunction with the attached Drawing Figures.

FIG. 1 shows a simplified block diagram of various electronic devices that are suitable for use in practicing the exemplary embodiments of this invention.

FIG. 2 is a PHICH resource map illustrating in four embodiments a first element of the invention for mapping PRB index to PHICH index according to a first parameter X.

FIG. 3 is a mapping diagram between PRB and PHICH illustrating, for the embodiment of the second row of FIG. 2, a second element of the invention which uses a second parameter to shift the PHICH index mapped according to the first parameter to the PRB index.

FIG. 4 is a mapping diagram between PRB and PHICH showing how the second parameter of FIG. 3 can be used to map two users allocated the same MU-MIMO UL PRB to different PHICH resources.

FIGS. 6A-B show 12 and 6 cyclic shifts respectively for different signaling spaces.

FIGS. 9A-B are logic flow diagrams that illustrate the operation of a method, and a result of execution of computer program instructions, in accordance with exemplary embodiments of this invention from the perspective of a UE and from the perspective of an access node, respectively.

DETAILED DESCRIPTION

Figure 5B:
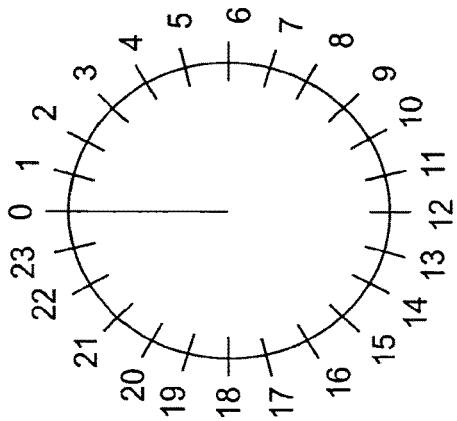
FIGS. 5A-C show cyclic shifts used for demodulation reference signals based on length of the allocated bandwidth.

Embodiments of this invention relate to mapping, which may preferably be defined in a wireless specification, which define default behavior for the UE and the eNodeB concerning the interpretation of the cyclic shifts (given by the CSI) of the DM RS such that the optimum cyclic shifts for different configurations will result in minimum offsets for the PHICH index modifier detailed in the above-referenced U.S. patent application Ser. No. 12/349,683. It is a default mapping behavior because it can be modified dynamically by the eNodeB for maximum flexibility in the wireless system. It is noted that while the exemplary implementations are detailed with respect to the LTE environment, these teachings may be implemented in any wireless system that maps a downlink channel to an uplink channel and that uses cyclic shifts in one of them.

As a preliminary matter before exploring details of various implementations, reference is made to FIG. 1 for illustrating a simplified block diagram of various electronic devices that are suitable for use in practicing the exemplary embodiments of this invention. In FIG. 1 a wireless network 9 is adapted for communication between a UE 10 and a Node B 12 (e.g., a wireless access node, such as a base station or particularly an e-NodeB for a LTE system). The network 9 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the Node B 12. The wireless links 20 represent in the particular embodiments described the various channels PDCCH, PHICH, PBCH and the like. For the case of MU-MIMO, the UEs 10 being allocated on the MU-MIMO basis may have more than one antenna 10E.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The e-NodeB 12 also includes a DP 12A, a MEM 12B, that stores a PROG 12C, and a suitable RF transceiver 12D coupled to one or more antennas 12E. The e-NodeB 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30.

Also within the e-NodeB 12 is a scheduler 12F that schedules the various UEs under its control for the various UL and DL radio resources. Once scheduled, the e-NodeB sends messages to the UEs with the scheduling grants (typically multiplexing grants for multiple UEs in one message). These grants are sent over particular channels such as the PDCCH in LTE. Generally, the e-NodeB 12 of an LTE system is fairly autonomous in its scheduling and need not coordinate with the GW/MME 14 excepting during handover of one of its UEs to another Node B.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required, as the scheduling grants and the granted resources/subframes are time dependent. The transceivers 10D, 12D include both transmitter and receiver, and inherent in each is a modulator/demodulator commonly known as a modem. The DPs 12A, 14A also are assumed to each include a modem to facilitate communication over the (hardwire) link 30 between the e-NodeB 12 and the GW 14.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the e-NodeB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Now is described the specific mapping from granted UL resource to PHICH described at the above referenced US patent application. Four distinct examples are shown in FIG. 2 of the relation between physical uplink resource allocations, those radio resources over which the UE 10 sends its UL transmissions, and the PHICH resources over which the e-NodeB 12 sends its ACK/NACK replies to those UL transmissions informing the UE either that the UL transmission was successfully received or not. Each row of FIG. 2 assumes a 10 MHz system bandwidth case as an example. Other options for system bandwidths are easily derived from this 10 MHz example. FIG. 2 illustrates the principle of creating a relation between the uplink resource allocation and the corresponding downlink PHICH index. It should be noted that the numbers shown at FIG. 2 are only indicative. For example, it might be preferable to have 24 PHICH channels over 25 PHICH channels in the second row since PHICH resources are created in multiples of 8.

Assume that for this 10 MHz bandwidth case there are 50 physical resource blocks which the e-NodeB has at its discretion available to allocate to various UEs. Recognize that at least for the time division multiplexing aspects of LTE, those 50 PRBs are all reserved for UL allocations, though for any given set of 50 PRBs some of them might not be allocated to any UE depending on traffic conditions. It is noted that, some of the physical uplink resources may continuously be reserved for the physical uplink control channel (PUCCH), and therefore, no UL data allocations can take place on these PRBs. The first row of FIG. 2, denoted "Full Resolution. PRB map, X=1", shows that for this 10 MHz bandwidth case there are 50 PHICH resources, so there will be a one-to-one mapping between the 50 PRBs available for allocation to the UEs and the 50 PHICH resources available for ACKing/NACKing those allocated PRBs. The PHICH resources can be considered more generically as DL resources. For simplicity, use an index 1-50 for the PRBs which will potentially be allocated to a UE for its UL transmission, and a similar index beginning at 1 for the PHICH resources. The index can be modified to begin at zero, but for this explanation assume it begins at 1. A cell-specific down sampling parameter, designated "X" at FIG. 2 and provided to the UE such as over a broadcast channel, indicates the number of PHICH resources matched against the number of PRBs in the system bandwidth. In this example X can take on four distinct values {00, 01, 10, 11}, the four rows of FIG. 2, and results in the following mapping rule corresponding to rows of FIG. 2 for the indicated values of the parameter X:

X=1, approximately every PRB is mapped to a unique PHICH resource

X=2, approximately every second PRB is mapped to a unique PHICH resource

X=3, approximately every third PRB is mapped to a unique PHICH resource

X=4, approximately every fourth PRB is mapped to a unique PHICH resource

For simplicity, the PRB index of the first allocated PRB is described as mapping or referring to the corresponding PHICH index of the potential PHICH resource. Index numbers for the PHICH resources are shown in each row of FIG. 2. The actual PHICH resource that relates to the PRB allocated for the UE's UL transmission can be further changed according to the above-referenced U.S. patent application (Ser. No. 12/349,683) by what is termed a PHICH index modifier (a second predetermined parameter). The PHICH index modifier gives greater flexibility for the eNodeB 12 to allocate for UE UL transmissions. For example, the e-NodeB 12 may choose for efficiency reasons to allocate to one UE PRB index number 10 and to a second UE PRB index number 11, while the parameter X is set to 2. Using only the parameter "X" would map one of those PRBs to a unique PHICH resource but the same would not be true of the other PRB.

The principle of the PHICH index modifier is shown in FIG. 3, which assumes X=2 since there are 25 PHICH resources in the bottom row for the 50 PRB resources available to the e-NodeB scheduler 12F in the top row. FIG. 3 shows generally the principle of using a PHICH index modifier, which gives the option of performing a shift of the implicitly given PHICH index.

But in the top row of FIG. 3 the e-NodeB scheduler 12F allocates (by whatever manner, dynamic, semi-persistent, etc) each of the shaded PRBs for UL resources to one or more UEs. The PRBs for the PRB indices 8 through 12 must each have a unique PHICH resource over which the e-NodeB 12 can send a corresponding ACK or NACK. As seen at FIG. 3, the PHICH index modifier tells how much and what direction to shift the PHICH index from that which maps to the PRB index using the first parameter X, and at FIG. 3 the PRB index 8 maps potentially to any of PHICH indices 3 through 6. Similar shifting can be done for each of the other PRB indices 9-12 of FIG. 3.

As a non-limiting example, the PHICH index modifier may be interpreted to modify the PHICH index (which is mapped by the first parameter X) as follows:

PHICH index modifier=00: Reduce value of PHICH index by 1

PHICH index modifier=01: Keep value of PHICH index

PHICH index modifier=10: Increase value of PHICH index by 1

PHICH index modifier=11: Increase value of PHICH index by 2

The PHICH index modifier is used for the case of MU-MIMO, where two users might be assigned to the same UL physical resources, and thereby potentially to the same PHICH index. Due to the fact that in LTE Rel. 8, the cyclic shift domain is the only orthogonal domain to provide orthogonal RS signals for different UEs paired to operate in MU-MIMO configuration, it is very probable the different MU-MIMO UEs will occupy exactly the same physical UL resources (as in FIG. 4). FIG. 4 assumes the same 50 PRBs available for allocation, X=2 so there are 25 PHICH resources for mapping, and both user 1 (a first UE) and user 2 (a second UE) are allocated a PRB for UL transmission with index=5. The PHICH index modifier is sent to each of user 1 and user 2 separately such as in the payload of their MU-MIMO allocation, so each can be sent by the e-NodeB 12 a different bit sequence for the PHICH index modifier and each offsets the mapping done only by the parameter X by a different value (or one does not offset at all, such as where PHICH index modifier=01 in the above example of how those bits are interpreted). As shown in FIG. 4, user 1 maps PRB index 5 to PHICH index 4 and user 2 maps PRB index 5 to PHICH index 3. FIG. 4 is considered a special allocation case, multiple user MIMO in the uplink. For such a case where two users share the same physical resources, the PHICH modifier is used to shift a user's allocation to a free PHICH resource.

From the above description of FIGS. 3-4, there is a connection between the allocated uplink physical resources, where the number of PHICH groups are calculated from one or a set of semi-static system parameters (the parameter "X"), and will be kept constant. Further, the above-referenced U.S. patent application (Ser. No. 12/349,683) uses the cyclic shift of the DM RS as the PHICH index modifier, in order to save on control signaling overhead. But for this PHICH index modifier to operate on a local basis, it needs to be referenced in a linear manner, meaning that it preferably shifts the PHICH channels to the next neighboring PHICH channels (with similar physical resource as the reference). Without this functionality, the PHICH index modifier will impact the PHICH channels that are being addressed by more distant physical resources. However, when looking at the optimum shifts for the cyclic shifts for the DMRS (which the e-NodeB sends with the scheduling grant), it is seen that the optimum operation of MU-MIMO is found when the cyclic shifts have the maximum cyclic shift distance between the scheduled UEs.

Figure 5C:
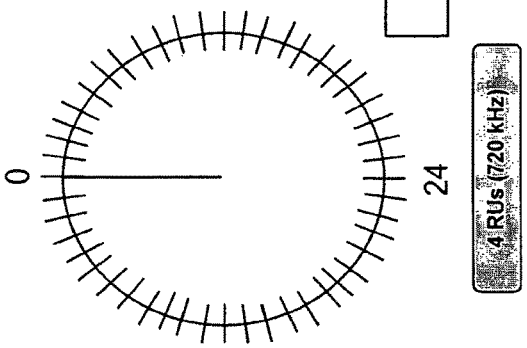
Figure 5A:
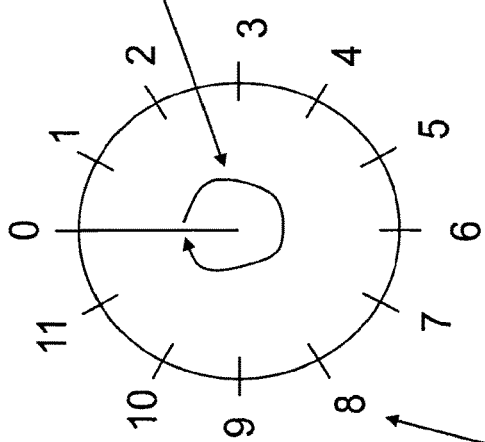

FIGS. 5 through 8 show the effect of CSI using specific examples from LTE. FIG. 5 makes clear that the length of the DM RS depends on the allocated bandwidth. At FIG. 5A there is one resource unit allocated, and the length of the DM RS is 180 kHz which allow twelve cyclic shifts (in the frequency domain). At FIG. 5B the allocated bandwidth is doubled to 2 resource units (360 kHz), and so there are 24 cyclic shifts available. Doubling again the allocated frequency resources at FIG. 5C gives a bandwidth of 720 kHz which allows 48 cyclic shifts of the DM RS.

According to exemplary aspects of this invention, the mapping rule from the granted UL resources to the PHICH associated with those resources also results in an optimum cyclic shift. The cyclic shift is represented by the CSI, which can be considered according to these teachings as being in two parts: a semi-static part and a dynamic part. Specific numbers of signaling bits are presented as non-limiting examples. The semi-static part of the CSI uses one bit to inform if the cyclic shift is dynamically assigned (e.g., via the UL grant) or semi-statically assigned (e.g., via system information such as may be sent over a broadcast channel). The semi-static part of the CSI also uses three or four bits to provide information about the cyclic shift that the UE is to use to decode its DM RS. The dynamic part of the CSI is three bits, and is absolute or relativistic with respect to the cell specific cyclic shift. An exemplary mapping between the signaled CSI value and actual cyclic shift value (relativistic or absolute) is shown in the table below.

| Dynamic CSI indicator | CS value |
|---|---|
| 000 | 0 |
| 001 | 2 |
| 010 | 4 |
| 011 | 6 |
| 100 | 8 |
| 101 | 10 |
| 110 | unused |
| 111 | unused |

While the number of cyclic shifts depends on the bandwidth, the amount of cyclic shifts does not vary in time, and so the above approach does not need to account for different bandwidths that may be allocated; it works equally well regardless of the allocated bandwidth. The cyclic shift in symbols is defined in an embodiment with reference to the cyclic shift of the minimum possible bandwidth for the system. Taking FIGS. 5A-C as an example, the minimum bandwidth is one resource block, and so the cyclic shift value of the DM RS varies across twelve shifts, indexed as [0, 1, 2 . . . 11].

FIGS. 6A-B illustrate how to support cyclic shifts with maximum separation. Using the LTE implementation details above as a non-limiting example, there are 12 (or six) cyclic shifts that need to be supported, which can be done with four signaling bits (leaving four unused states of the signaling bits that do not have a companion cyclic shift). FIG. 6A illustrates those twelve shifts, which would be satisfactory for any bandwidth so long as the allocated bandwidth is a multiple of this minimum 1 resource unit bandwidth as is the LTE system. With reference to FIG. 6B, there are shown only six cyclic shifts, the advantage over FIG. 6A being that they can be signaled with only the three semi-static signaling bits (leaving two unused states). These signaling bits are control bits, and so the signaling is repeated often and saving one bit on each signaling instance accumulates to a non-negligible bandwidth savings. Not every cyclic shift can be independently signaled with only three bits, but if the guiding principle is to support cyclic shift separation so that the UEs being granted the resources can decode their DM RS and receive their allocation without uncertainty about another MU-MIMO UE's resource allocation, then independently signaling six cyclic shifts may be an appropriate solution for dynamic signaling.

Figures 7A, 7B:
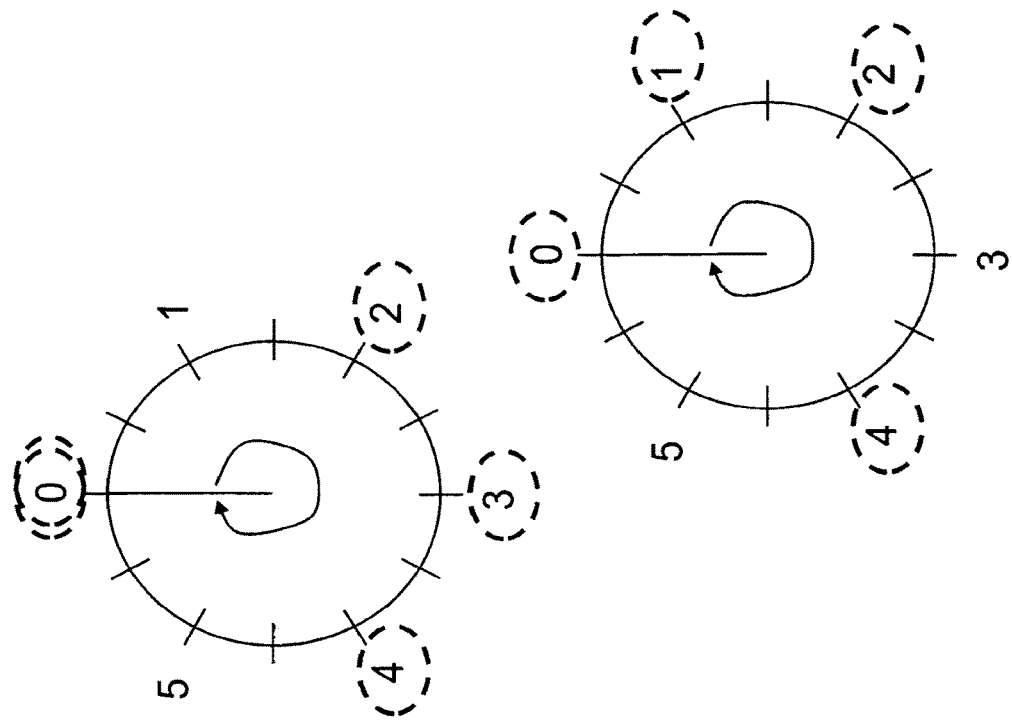
FIGS. 7A-B show various cyclic shifts available for a MU-MIMO allocation to 4 UEs when 6 cyclic shifts are available with a 3-bit signaling space.

Separation of the cyclic shifts for the condition where there are six shifts available to choose from is shown with reference to FIGS. 7A-7B. The index i is selected from the set [0, 1, 2, . . . 5], to represent the cyclic shift that can be signaled with three bits as in FIG. 6B. Note that while these examples define the cyclic shifts relative to the resource number for convenience, it is also possible to define the cyclic shifts in absolute terms. It is noted that allocation of CS is a scheduler issue. However, the general goal is to maximize the CS separation between the MU-MIMO UEs.

For the case of a MU-MIMO allocation to two UEs, the preferred CSI of the DM RS that is sent with the resource allocation can be represented as [i, mod(i+3,6)]. For the case of a MU-MIMO allocation to three UEs, the CSI of the DM RS that is sent with the resource allocation can be represented as [i, mod(i+2,6), mod(i+4,6)]. In each of the case of two or three UEs and six cyclic shifts, the cyclic shifts of each UE can be spaced from that of the others; no UE will use a cyclic shift that is adjacent to a cyclic shift used by another one of the MU-MIMO UEs. For the case of a MU-MIMO allocation to four UEs, there is only marginal room for optimization as only two of the four cyclic shifts that should be used can be made non-adjacent to one another as seen at FIG. 7A where CSI #s 2, 3 and 4 are adjacent to one another and spacing from all other MU-MIMO CSIs is given only for CSI #0. Re-arranging which cyclic shifts are used as in FIG. 7B can alleviate the problem only to the extent that one (and only one) of the four MU-MIMO UEs can be given the cyclic shift that is spaced from all other cyclic shifts, as seen at FIG. 7B where CSI #s 0, 1 and 2 are adjacent to one another and spacing from all other MU-MIMO CSIs is now given only for CSI #4. For the case of five or six MU-MIMO UEs, there is no room for optimization since every cyclic shift in use will have at least one adjacent cyclic shift in use by another MU-MIMO UE.

Figure 8:
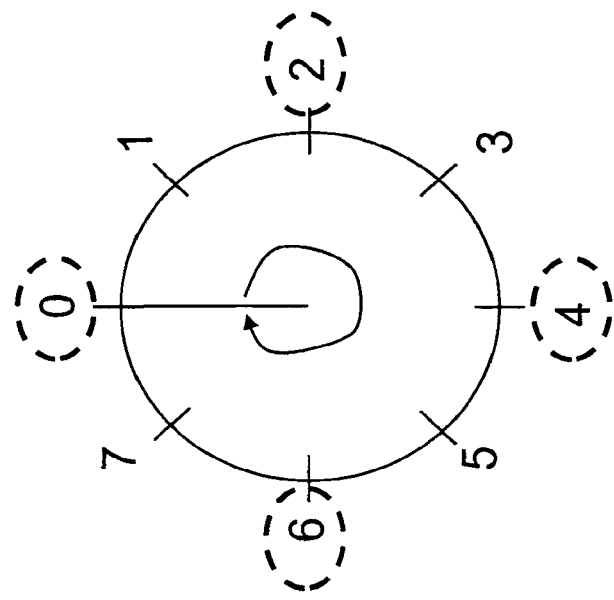
FIG. 8 shows cyclic shifts available for a MU-MIMO allocation to 4 UEs when 8 cyclic shifts are available with a 3-bit signaling space.

It is clear that some additional flexibility may be gained by using those two unused states of the four CSI signaling bits, so that eight cyclic shifts can be signaled. This may not be the most practical for implementation in LTE at least to the extent that the UL bandwidth options in LTE are currently understood (not all bandwidth options are divisible by eight), but assuming there are eight cyclic shifts indicated by the three signaling bits then a MU-MIMO allocation to two UEs can separate their cyclic shifts as [i, mod(i+4,8)], and a MU-MIMO allocation to four UEs can separate their cyclic shifts as [i, mod(i+2,8), mod(i+4,8), mod(i+6,8)] as shown at FIG. 8. There is marginal room for optimization for a MU-MIMO allocation for three, five or seven UEs, and no room for optimization for the case of a MU-MIMO allocation to seven or eight UEs.

Returning to the mapping between the UL resource and the PHICH on which the ACK/NACK for that resource is sent, the prior art known to the inventors have focused on how to allocate resources and make sure that there is a consistent configuration of the physical channels. Currently there is not known any suggestions to perform mapping between optimum cyclic shifts to create a linear relation in the PHICH index. According to these teachings there is a mapping rule (preferably defined in wireless specifications and locally stored in the memories of the e-NodeB and the UEs so that all UEs and e-NodeB's would map similarly) which defines the default UE and eNB behavior concerning the interpretation of the cyclic shift of the DM RS, such that the optimum cyclic shifts for different configurations will lead to minimum offsets for the PHICH index modifier.

One particular implementation to perform the calculations related to this invention is to have a mapping rule which can be described in two steps: first create a mapping pattern which provides the optimum cyclic shifts for the different MU-MIMO UEs; and second create an inverse mapping to the PHICH index modifier, which creates the desired mapping. These are detailed in turn.

First, the mapping pattern to provide the optimum cyclic shifts for the different MU-MIMO UEs. The equation below uses the following notation: k=UE multi-user index (that is, k=0, 1, 2 for the 3 different MU-MIMO UEs); M is the total number of MU-MIMO UEs allocated at the same time; and X is the number of states/legal/allowed cyclic shifts. Following this, the optimum cyclic shift (CS) may be calculated as:

$$CS\_k = \mathrm{mod}(\mathrm{floor}(k*X/M), X) \quad [1]$$

This again means that for the case of 6 states (X) being the maximum number of cyclic shifts as in FIG. 6B, one possible mapping pattern may be as follows:

| M | K | CS_k |
|---|---|---|
| 2 | {0, 1} | {0, 3} |
| 3 | {0, 1, 2} | {0, 2, 4} |
| 4 | {0, 1, 2, 3} | {0, 1, 3, 4} |
| 5 | {0, 1, 2, 3, 4} | {0, 1, 2, 3, 4} |
| 6 | {0, 1, 2, 3, 4, 5} | {0, 1, 2, 3, 4, 5} |

The dynamic CS indicator may be readily included in the UL grant, and provides a CS index relative to the cell-specific CS that is signalled using higher layer signaling. Term this parameter CS_cell. Consider that the parameter CS_cell is defined using Y possible cyclic shift values CS_cell={0, 1, 2, 3, . . . , Y−1}. Furthermore, for a straightforward LTE implementation then Y={6,12}. For the case where the dynamic CS indicator is used as an absolute CS indicator, the parameter CS_cell is equal to zero.

The actual cyclic shift, measured in symbols, depends on the PUSCH bandwidth. It can be calculated as $$\mathrm{Cyclic\_shift\_symbols} = \frac{\mathrm{mod}\left(\left(\frac{Y \times CS\_k}{X} + CS\_cell\right), Y\right) \times RS\_length}{Y} \quad [2]$$

Equation [2] is general enough that the cyclic shift takes into account both dynamic cyclic shift and cell specific cyclic shift.

Now for the second step, creating the inverse mapping to the PHICH index modifier. Given that the forward mapping is in place from the first step above, an inverse mapping to the PHICH channel index modifier will readily create the desired mapping from UL resource to its associated DL PHICH. It should be noted that we cannot simply use the UE's PHICH offset (index modifier) for calculating the CSI offsets, as these might change from cell to cell in a non-predetermined way. One non-limiting example of how the PHICH index identifier may be defined is shown in the following table (the corresponding mapping for cyclic shift CS values is shown in the "Dynamic CSI/Cyclic Shift value" table above).

| PHICH index modifier | | |
|---|---|---|
| Dynamic CS indicator | M = 2 | M = 3 |
| 000 | 000 | 000 |
| 001 | 010 | 011 |
| 010 | 100 | 001 |
| 011 | 001 | 100 |
| 100 | 011 | 010 |
| 101 | 101 | 101 |
| 110 | n/a | n/a |
| 111 | n/a | n/a |

As shown in the previous table, in an exemplary embodiment the PHICH resource space may not be the same as the CS signaling space although it can be of the same size. Alternatively, either CS space or PHICH space can be larger. This creates the need for optimizing the mapping between the PHICH index modifier and the CS indicator.

The PHICH mapping could be optimized either e.g., for M=2 or M=3. The benefit of this arrangement is that PHICH resource consumption can be minimized in case when MU-MIMO scheduling is applied. This can be seen e.g., when PHICH index modifier with M=2 is used: the e-NodeB reserves always for the MU-MIMO domain the adjacent PHICH resources. This type of PHICH modifier indexing will minimize the size of the PHICH resource and it will simultaneously optimize the cyclic shift allocation for the case where MU-MIMO scheduling is applied. The end result is that the size of the PHICH can be minimized without compromising the cyclic shift allocation.

In an embodiment some meaning is defined also for CSI values of "110" and "111" (assuming that only six out of eight CS values are in use). These CSI values can be mapped e.g., into cyclic shift value of "0". They are mapped into pre-defined values, e.g., "110" and "111" also from the PHICH index modifier perspective. These values can be optimized purely from the PHICH index modifier point of view and can be used in the case when MU-MIMO is not applied by the scheduler.

Figure 9A:
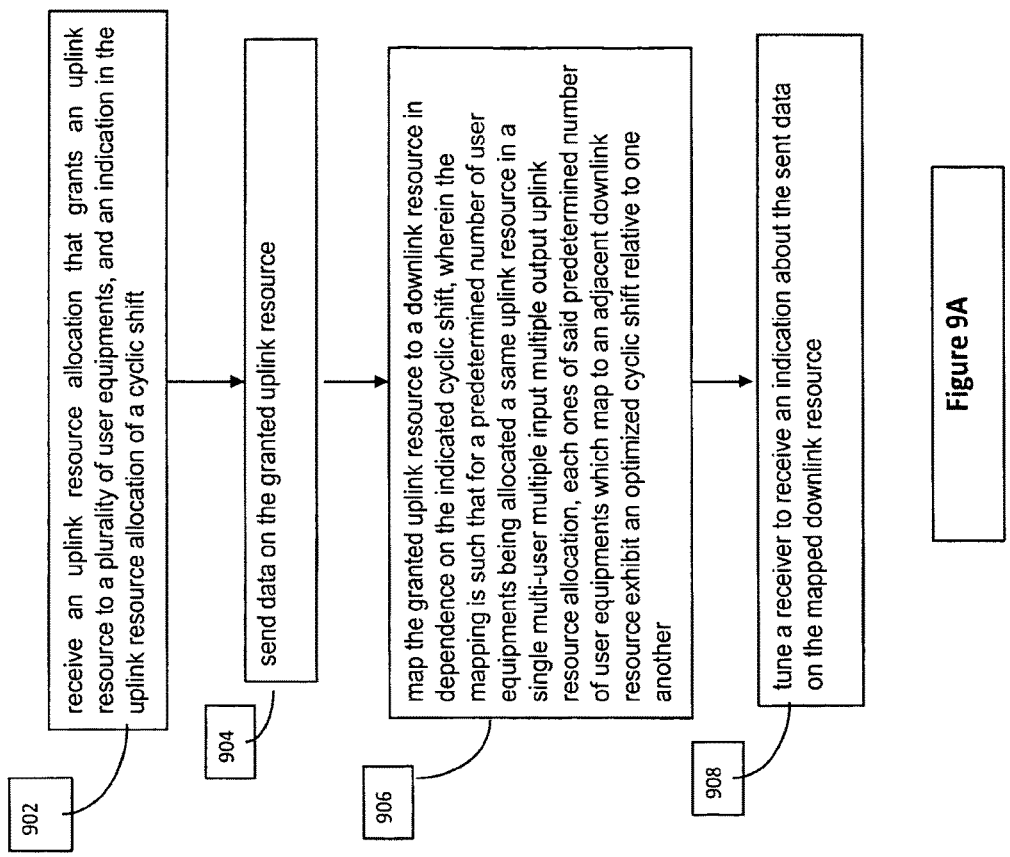

From the above description and with reference to FIG. 9A it is apparent that embodiments of this invention include an apparatus such as a portable user equipment, a computer program embodied on a memory that may be disposed in the user equipment, and a method by which the user equipment receives at block 902 an uplink resource allocation that grants an uplink resource to a plurality of user equipments, and an indication in the uplink resource allocation of a cyclic shift, sends data at block 904 on the granted UL resource, maps at block 906 the granted uplink resource to a downlink resource in dependence on the indicated cyclic shift, and the mapping is such that for a predetermined number of user equipments being allocated a same uplink resource in a single multi-user multiple input multiple output uplink resource allocation, each ones of said predetermined number of user equipments which map to an adjacent downlink resource exhibit an optimized cyclic shift relative to one another, and then at block 908 tunes a receiver to receive on the mapped downlink resource an indication about the sent data.

In particular embodiments any of the various following aspects may be implemented singularly or in any combination with the embodiments described immediately above for the user equipment: the UL resource allocation is a MU-MIMO allocation on a PDCCH and the plurality of UEs are granted a MU-MIMO grant; the reference signal is a demodulation reference signal and the indication of the cyclic shift is a dynamic cyclic shift indicator of three bits that indicates one of relative cyclic shift in the cell in which the e-NodeB operates or an absolute cyclic shift, the mapping of the cyclic shift to the DL channel is to a PHICH index modifier and the mapping is according to a linear mapping rule stored in a local memory of the UE; and the indication about the sent data is one of an ACK and a NACK received on the PHICH adjusted by the offset where the offset is a PHICH index modifier.

Similarly from the Node B's perspective and with reference to FIG. 9B, embodiments of this invention include an apparatus such as a network element (e.g., Node B), a computer program embodied on a memory that may be disposed in the network element, and a method by which the network element sends at block 912 an uplink resource allocation that grants an uplink resource to a plurality of user equipments, and an indication in the uplink resource allocation of a cyclic shift for each of the plurality of user equipments, maps at block 914 the granted uplink resource to a downlink resource in dependence on the indicated cyclic shift for each of the plurality of user equipments, wherein the mapping is such that for a predetermined number of user equipments being allocated a same uplink resource in a single multi-user multiple input multiple output uplink resource allocation, each pair of said predetermined number of user equipments which map to an adjacent downlink resource exhibit an optimized cyclic shift relative to one another, and then at block 916 send to each of the respective plurality of user equipments on the respective mapped downlink resource an indication about data received from the respective plurality of user equipments.

In particular embodiments any of the various following aspects may be implemented singularly or in any combination with the embodiments described immediately above for the network element: the UL resource allocation is a MU-MIMO allocation on a PDCCH and the plurality of UEs are granted a MU-MIMO grant; the reference signal is a demodulation reference signal and the indication of the cyclic shift is a dynamic cyclic shift indicator of three bits that indicates one of relative cyclic shift in the cell in which the e-NodeB operates or an absolute cyclic shift, the e-NodeB further monitors the granted UL resource that was granted to each of the plurality of UEs for data from the respective UEs; the mapping of the cyclic shift to the DL channel offset is to a PHICH index modifier by a linear mapping rule stored in a local memory of the e-NodeB; and the indication sent on the unique DL channel is one of an ACK and a NACK sent on the PHICH adjusted by the offset where the offset is a PHICH index modifier.

For the aspects of this invention related to network, embodiments of this invention may be implemented by computer software executable by a data processor of the Node B 12, such as the processor 12A shown, or by hardware, or by a combination of software and hardware. For the aspects of this invention related to user equipment, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

What is claimed is:

1. A user equipment comprising:
   a receiver configured to receive an uplink resource allocation for a multi-user multiple input/multiple output transmission that grants an uplink resource allocation to the user equipment and at least one other user equipment in an evolved universal terrestrial radio access network, and an indication in the granted uplink resource allocation of a cyclic shift of a demodulation reference signal;
   a transmitter configured to send data on the granted uplink resource;
   a processor mapping the granted uplink resource in dependence on the indication to a downlink resource adjacent to a downlink resource mapped at the at least one other user equipment on a physical H-ARQ indicator channel, wherein the receiver is further configured to receive on the downlink resource mapped at the user equipment an indication about positive or negative acknowledgement of the sent data; and a memory configured to store a mapping rule ensuring that cyclic shifts between the user equipment and the at least one other user equipment are calculated as: CS_k=mod(floor(k*X/M), X), where CS_k denotes the cyclic shift for user equipment k in the multi-user multiple input/multiple output transmission, X is a number of allowed cyclic shifts, and M is a number of user equipments in the multi-user multiple input/multiple output transmission.

2. The user equipment of claim 1, wherein the indication is a dynamic cyclic shift indicator of three bits that indicates a user-specific cyclic shift.

3. The user equipment of claim 1, wherein an adjacent downlink resource is a downlink resource with similar physical resource on the physical H-ARQ indicator channel.

4. The user equipment of claim 3, wherein the indication is used as a physical H-ARQ indicator channel modifier for offsetting the downlink resource mapped at the user equipment from the downlink resource mapped at the at least one other user equipment.

5. The user equipment of claim 4, wherein the number of allowed cyclic shifts X=12.

6. The user equipment of claim 5, wherein the number of user equipments in the multi-user multiple input/multiple output transmission M is one of 2, 3, 4, 5 and 6.

7. A method comprising:
sending from an access node an uplink resource allocation to a first user equipment for a multi-user multiple input/multiple output transmission that grants an uplink resource to the first user equipment and at least one second user equipment in an evolved universal terrestrial radio access network, and an indication in the granted uplink resource allocation of a cyclic shift specific of a demodulation reference signal;
receiving data from the first user equipment the at least one second user equipment on the granted uplink resource;
mapping the granted uplink resource at the access node in dependence on the indicated cyclic shift to a first downlink resource adjacent to a second downlink resource on a physical H-ARQ indicator channel; and
sending from the access node indications about positive or negative acknowledgement of the received data on the first downlink resource to the first user equipment and on the second downlink resource to the at least one second user equipment, wherein a rule in the mapping ensures that cyclic shifts between the user equipment and the at least one other user equipment are calculated as: CS_k=mod(floor(k*X/M), X), where CS_k denotes the cyclic shift for user equipment k in the multi-user multiple input/multiple output transmission, X is a number of allowed cyclic shifts, and M is a number of user equipments in the multi-user multiple input/multiple output transmission.

8. The method of claim 7, wherein:
the indication is a dynamic cyclic shift indicator of three bits that indicates a user-specific cyclic shift.

9. The method of claim 7, wherein an adjacent downlink resource is a downlink resource with similar physical resource on the physical H-ARQ indicator channel.

10. The method of claim 9, wherein the indication is used as a physical H-ARQ indicator channel modifier for offsetting the downlink resource to the first user equipment from the downlink resource to the at least one second user equipment.

11. The method of claim 10, wherein the number of allowed cyclic shifts X=12.

12. The method of claim 11, wherein the number of user equipments in the multi-user multiple input/multiple output transmission M is one of 2, 3, 4, 5 and 6.

13. An apparatus comprising:
a transmitter configured to send an uplink resource allocation to a first user equipment that grants an uplink resource to the first user equipment and at least one second user equipment in an evolved universal terrestrial radio access network, and an indication in the granted uplink resource allocation of a cyclic shift of a demodulation reference signal;
a processor mapping the granted uplink resource in dependence on the indicated cyclic shift to a first downlink resource adjacent to a second downlink resource on a physical H-ARQ indicator channel; and
a receiver configures to receive data from the first user equipment and the at least one second user equipment on the granted uplink resource, wherein the transmitter is further configured to send indications about positive or negative acknowledgement of the received data on the first downlink resource to the first user equipment and on the second downlink resource to the at least one second user equipment; and
a memory configured to store a mapping rule ensuring that cyclic shifts between the first user equipment and the at least one second user equipment are calculated as: CS_k=mod(floor(k*X/M), X), where CS_k denotes the cyclic shift for user equipment k in the multi-user multiple input/multiple output transmission, X is a number of allowed cyclic shifts, and M is a number of user equipments in the multi-user multiple input/multiple output transmission.

14. The apparatus according to claim 13, wherein the indication of the cyclic shift is a dynamic cyclic shift indicator of three bits that indicates a user-specific cyclic shift.

15. The apparatus of claim 13, wherein an adjacent downlink resource is a downlink resource with similar physical resource on the physical H-ARQ indicator channel.

16. The apparatus of claim 15, wherein the indication is used as a physical H-ARQ indicator channel modifier for offsetting the downlink resource to the first user equipment from the downlink resource to the at least one second user equipment.

17. The apparatus of claim 16, wherein the number of allowed cyclic shifts X=12.

18. The apparatus of claim 17, wherein the number of user equipments in the multi-user multiple input/multiple output transmission M is one of 2, 3, 4, 5 and 6.

19. A method comprising:
receiving at a user equipment an uplink resource allocation for a multi-user multiple input/multiple output transmission that grants an uplink resource allocation to the user equipment and at least one other user equipment in an evolved universal terrestrial radio access network and an indication in the granted uplink resource allocation of a cyclic shift of a demodulation reference signal;
sending data from the user equipment on the granted uplink resource;
mapping the granted uplink resource at the user equipment in dependence on the indication to a downlink resource adjacent to a downlink resource mapped at the at least one other user equipment on a physical H-ARQ indicator channel; and
receiving at the user equipment on the downlink resource mapped at the user equipment an indication about positive or negative acknowledgement of the sent data, wherein a rule in the mapping ensures that cyclic shifts between the user equipment and the at least one other user equipment are calculated as: $CS\_k=\mathrm{mod}(\mathrm{floor}(k*X/M),X)$, where $CS\_k$ denotes the cyclic shift for user equipment k in the multi-user multiple input/multiple output transmission, X is a number of allowed cyclic shifts, and M is a number of user equipments in the multi-user multiple input/multiple output transmission.

20. The method of claim 19, wherein the indication of the cyclic shift is a dynamic cyclic shift indicator of three bits that indicates a user-specific cyclic shift.

21. The method of claim 19, wherein an adjacent downlink resource is a downlink resource with similar physical resource on the physical H-ARQ indicator channel.

22. The method of claim 21, wherein the indication is used as a physical H-ARQ indicator channel modifier for offsetting the downlink resource mapped at the user equipment from the downlink resource mapped at the at least one other user equipment.

23. The method of claim 22, wherein the number of allowed cyclic shifts X=12.

24. The method of claim 23, wherein the number of user equipments in the multi-user multiple input/multiple output transmission M is one of 2, 3, 4, 5 and 6.

25. A computer program product embodied on a non-transitory computer-readable medium storing a program of computer readable instructions that, when executed by a computer, is configured to provide instructions to control or carry out:

receiving at a user equipment an uplink resource allocation for a multi-user multiple input/multiple output transmission that grants an uplink resource allocation to the user equipment and at least one other user equipment in an evolved universal terrestrial radio access network and an indication in the granted uplink resource allocation of a cyclic shift of a demodulation reference signal;

sending data from the user equipment on the granted uplink resource;

mapping the granted uplink resource at the user equipment in dependence on the indication to a downlink resource adjacent to a downlink resource mapped at the at least one other user equipment on a physical H-ARQ indicator channel; and receiving at the user equipment on the downlink resource mapped at the user equipment an indication about positive or negative acknowledgement of the sent data, wherein a rule in the mapping ensures that cyclic shifts between the user equipment and the at least one other user equipment are calculated as: $CS\_k=\mathrm{mod}(\mathrm{floor}(k*X/M), X)$, where $CS\_k$ denotes the cyclic shift for user equipment k in the multi-user multiple input/multiple output transmission, X is a number of allowed cyclic shifts, and M is a number of user equipments in the multi-user multiple input/multiple output transmission.

26. A computer program product embodied on a non-transitory computer-readable medium storing a program of computer readable instructions that, when executed by a computer, is configured to provide instructions to control or carry out:

sending from an access node an uplink resource allocation to a first user equipment for a multi-user multiple input/multiple output transmission that grants an uplink resource to the first user equipment and at least one second user equipment in an evolved universal terrestrial radio access network, and an indication in the granted uplink resource allocation of a cyclic shift specific of a demodulation reference signal;

receiving data from the first user equipment the at least one second user equipment on the granted uplink resource;

mapping the granted uplink resource at the access node in dependence on the indicated cyclic shift to a first downlink resource adjacent to a second downlink resource on a physical H-ARQ indicator channel and sending from the access node indications about positive or negative acknowledgement of the received data on the first downlink resource to the first user equipment and on the second downlink resource to the at least one second user equipment, wherein a rule in the mapping ensures that cyclic shifts between the user equipment and the at least one other user equipment are calculated as: $CS\_k=\mathrm{mod}(\mathrm{floor}(k*X/M), X)$, where $CS\_k$ denotes the cyclic shift for user equipment k in the multi-user multiple input/multiple output transmission, X is a number of allowed cyclic shifts, and M is a number of user equipments in the multi-user multiple input/multiple output transmission.

\* \* \* \* \*